United States Patent
Li et al.

(10) Patent No.: US 11,556,715 B2
(45) Date of Patent: *Jan. 17, 2023

(54) METHOD FOR TRAINING LANGUAGE MODEL BASED ON VARIOUS WORD VECTORS, DEVICE AND MEDIUM

(71) Applicant: BEIJING BAIDU NETCOM SCIENCE AND TECHNOLOGY CO., LTD., Beijing (CN)

(72) Inventors: Zhen Li, Beijing (CN); Yukun Li, Beijing (CN); Yu Sun, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 148 days.

This patent is subject to a terminal disclaimer.

(21) Appl. No.: 16/951,702

(22) Filed: Nov. 18, 2020

(65) Prior Publication Data

US 2021/0374352 A1 Dec. 2, 2021

(30) Foreign Application Priority Data

May 29, 2020 (CN) .......................... 202010479619.0

(51) Int. Cl.
*G06F 40/30* (2020.01)
*G06N 20/00* (2019.01)
*G06F 40/279* (2020.01)

(52) U.S. Cl.
CPC ............ *G06F 40/30* (2020.01); *G06F 40/279* (2020.01); *G06N 20/00* (2019.01)

(58) Field of Classification Search
CPC ...... G06F 40/30; G06F 40/279; G06F 40/284; G06F 40/289; G06N 20/00; G06N 3/0454; G06N 3/08; G06K 9/6277

USPC ............................................................ 704/9
See application file for complete search history.

(56) References Cited

U.S. PATENT DOCUMENTS

| | | | |
|---|---|---|---|
| 10,242,090 B1 * | 3/2019 | Kosloski | G06F 16/35 |
| 11,003,865 B1 * | 5/2021 | Lee | G06F 40/49 |
| 2020/0258498 A1 * | 8/2020 | Reisswig | G10L 15/183 |
| 2020/0410337 A1 * | 12/2020 | Huang | G06N 3/04 |

(Continued)

OTHER PUBLICATIONS

"Adjacency Matrix;"Wolfram MathWorld; Feb. 11, 2019; wolfram.com; pp. 1-2.*

(Continued)

*Primary Examiner* — Andrew R Dyer
(74) *Attorney, Agent, or Firm* — Brooks Kushman P.C.

(57) ABSTRACT

A method for training a language model based on various word vectors, a device and a medium, which relate to the field of natural language processing technologies in artificial intelligence, are disclosed. An implementation includes inputting a first sample text language material including a first word mask into the language model, and outputting a context vector of the first word mask via the language model; acquiring a first probability distribution matrix of the first word mask based on the context vector of the first word mask and a first word vector parameter matrix, and a second probability distribution matrix of the first word mask based on the context vector of the first word mask and a second word vector parameter matrix; and training the language model based on a word vector corresponding to the first word mask.

15 Claims, 6 Drawing Sheets

(56) References Cited

U.S. PATENT DOCUMENTS

| | | | | |
|---|---|---|---|---|
| 2021/0012199 A1* | 1/2021 | Zhang | .................. | G06F 16/29 |
| 2021/0142164 A1* | 5/2021 | Liu | .................. | G06F 40/30 |
| 2021/0183484 A1* | 6/2021 | Shaib | .................. | G06F 40/295 |
| 2021/0264109 A1* | 8/2021 | Srinivasan | .................. | G06F 40/166 |
| 2021/0271822 A1* | 9/2021 | Bui | .................. | G06N 3/08 |
| 2021/0303783 A1* | 9/2021 | Misra | .................. | G06F 40/44 |
| 2021/0374334 A1* | 12/2021 | Li | .................. | G06F 17/16 |
| 2021/0374343 A1* | 12/2021 | Li | .................. | G06K 9/6256 |
| 2022/0180202 A1* | 6/2022 | Yin | .................. | G06N 3/084 |

OTHER PUBLICATIONS

Ben Lutkevich; Language Modelling; Mar. 2020; techtarget.com; pp. 1-4.*

Rani Horev; BERT Explained: State of the art language model for NLP; Nov. 10, 2018; towardsdatascience.com; pp. 1-8.*

Extended European Search Report of European application No. 21160193.5 dated Aug. 25, 2021,11 pages.

Levine et al., "SenseBERT" Driving Some Sense into Bert, arxiv.org, Cornell University Library, 201 Olin Library Cornell University Ithaca, NY, May 18, 2020, XP081664118, 12 pages.

Ji et al., "Levering Concept-Enchanced Pre-Training Model and Masked-Entity Language Model for Named Entity Disambiguation", IEEE Access, IEEE, USA, vol. 8, May 12, 2020, pp. 100469-100484.

Sun et al., "ERNIE: Enhanced Representation through Knowledge Integration", Computer Science, Cornell University Library, 201 Olin Library Cornell University Ithaca, NY, Apr. 19, 2019, pp. 1-8, XP081171557, 8 pages.

Sun et al., "ERNIE 2.0: A Continual Pre-training Framework for Language Understanding", arxiv.org, Cornell University Library, Olin Library Cornell University, Ithaca, NY, Jul. 29, 2019, XP081536565, 8 pages.

* cited by examiner

METHOD FOR TRAINING LANGUAGE MODEL BASED ON VARIOUS WORD VECTORS, DEVICE AND MEDIUM

CROSS-REFERENCE TO RELATED APPLICATIONS

The present application claims the priority and benefit of Chinese Patent Application No. 2020104796190, filed on May 29, 2020. The disclosure of the above application is incorporated herein by reference in its entirety.

TECHNICAL FIELD

The present disclosure relates to the field of computer technologies, and particularly to a natural language processing technology in artificial intelligence, and in particular, to a method for training a language model based on various word vectors, a device and a medium.

BACKGROUND

In the field of natural language processing (NLP) of Chinese, a self-supervised pre-training process of a language model is performed using a large amount of unsupervised text, and then, parameters of the language model are finely tuned using supervised task data, which is an advanced language-model training technology in the field of NLP.

In the existing art, in order to prevent the training effect of the language model from being influenced by the performance of a word segmenter, the self-supervised pre-training process of the language model is performed based on character granularity, such that it is difficult for the language model to learn information with greater semantic granularity (for example, words), an information leakage risk may exist, and the process of learning the semantics of the words by the language model may be damaged, thereby influencing the prediction performance of the language model.

SUMMARY

Various aspects of the present application provide a method and apparatus for training a language model based on various word vectors, a device and a medium, so as to avoid an information leakage risk caused by a learning process based on character granularity, enhance the capacity of the language model to learn word meaning information, and improve the prediction performance of the language model.

According to a first aspect, there is provided a method for training a language model based on various word vectors, including: inputting a first sample text language material including a first word mask into the language model, and outputting a context vector of the first word mask via the language model; acquiring a first probability distribution matrix of the first word mask based on the context vector of the first word mask and a first word vector parameter matrix, and acquiring a second probability distribution matrix of the first word mask based on the context vector of the first word mask and a second word vector parameter matrix; wherein the first word vector parameter matrix is a pre-trained word vector parameter matrix corresponding to the language model, and the second word vector parameter matrix is a pre-trained word vector parameter matrix corresponding to another language model; determining a word vector corresponding to the first word mask based on the first probability distribution matrix and the second probability distribution matrix; and training the language model based on the word vector corresponding to the first word mask until a first preset training completion condition is met.

According to a second aspect, there is provided an apparatus for training a language model based on various word vectors, including: the language model configured to receive a first sample text language material including a first word mask, and output a context vector of the first word mask; an acquiring unit configured to acquire a first probability distribution matrix of the first word mask based on the context vector of the first word mask and a first word vector parameter matrix, and to acquire a second probability distribution matrix corresponding to the first word mask based on the context vector of the first word mask and a second word vector parameter matrix; wherein the first word vector parameter matrix is a pre-trained word vector parameter matrix corresponding to the language model, and the second word vector parameter matrix is a pre-trained word vector parameter matrix corresponding to another language model; a first determining unit configured to determine a word vector corresponding to the first word mask based on the first probability distribution matrix and the second probability distribution matrix; and a first training unit configured to train the language model based on the word vector corresponding to the first word mask until a first preset training completion condition is met.

According to a third aspect, there is provided an electronic device, including: at least one processor; and a memory connected with the at least one processor communicatively; wherein the memory stores instructions executable by the at least one processor to cause the at least one processor to perform the method of the aspect as described above and any possible implementation.

According to a fourth aspect, there is provided a non-transitory computer-readable storage medium with computer instructions stored thereon, where the computer instructions are used for causing a computer to perform the method of the aspect as described above and any possible implementation.

According to the above-mentioned technical solution, in some embodiments of the present application, the first sample text language material including the first word mask is input into the language model, and the context vector of the first word mask is output via the language model; the first probability distribution matrix is obtained based on the context vector of the first word mask and the first word vector parameter matrix which is a pre-trained word vector parameter matrix corresponding to the language model, and the second probability distribution matrix is obtained based on the context vector of the first word mask and the second word vector parameter matrix which is a pre-trained word vector parameter matrix corresponding to another language model; then, the word vector corresponding to the first word mask is determined based on the first and second probability distribution matrices; and the language model is trained based on a word vector corresponding to the first word mask until the first preset training completion condition is met, so as to obtain the trained language model. In some embodiments of the present application, the second word vector parameter matrix corresponding to another language model is introduced, and meanwhile, the language model is trained based on the first and second word vector parameter matrices by combining various high-quality word vectors, such that the language model learns multi-source high-quality word meaning information, the capacity of the language model to learn the word meaning information is enhanced, and the prediction performance of the language model is improved.

In addition, with the technical solution of the present application, the language model is trained with the sample text language material including the word mask, and since the word vectors contain richer semantic information representation compared with character vectors, when the word vectors are modeled by means of the word mask based on contexts, the process of modeling the word meaning information by the language model is enhanced, the capacity of the language model to learn the word meaning information is enhanced, and the information leakage risk possibly caused by character-based whole word mask may be avoided effectively.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

In order to more clearly explain the technical solutions of the embodiments of the present application, the drawings to be used in the descriptions of the embodiments or the prior art are briefly introduced as follows. Apparently, the following drawings illustrate some embodiments of the present application, and a person skilled in the art can obtain other drawings from these drawings without any creative effort. The drawings are only used for better understanding the present solution and do not constitute a limitation of the present application. In the drawings.

DETAILED DESCRIPTION

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Apparently, the embodiments to be described are merely a part rather than all of the embodiments of the present application. All other embodiments obtained by a person of ordinary skill in the art based on the embodiments of the present application without creative efforts shall fall within the protection scope of the present application.

It should be noted that a terminal in the embodiments of the present application may include, but is not limited to, a mobile phone, a personal digital assistant (PDA), a wireless handheld device, a tablet computer, a personal computer (PC), an MP3 player, an MP4 player, a wearable device (for example, smart glasses, smart watches, smart bracelets, or the like), a smart home device, and other smart devices.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects before and after have a relationship of "or".

In the existing art, the self-supervised pre-training process of a language model is performed based on character granularity, such that it is difficult for the language model to learn information with greater semantic granularity (for example, words), an information leakage risk may exist, and the process of learning the semantics of words by the language model may be damaged, thereby influencing the prediction performance of the language model.

For example, in the pre-training process of an enhanced representation from knowledge Integration (ERNIE) model in an existing language model, the ERNIE model learns the expression of entities by means of character-based whole word mask. However, the character-based whole word mask method still does not explicitly introduce information with greater semantic granularity, for example, word vectors; in addition, an information leakage risk may exist; for example, for a text "哈 (ha)尔 (er)滨 (bin)是 (shi)黑 (hei)龙 (long)江 (jiang)的 (de)省 (sheng)会 (hui) (which means in English: HarBin is the provincial capital of Heilongjiang)", the characters "哈 (ha)", "尔 (er)" and "滨 (bin)" are replaced by three masks respectively to obtain "[mask][mask][mask] 是 (shi)黑 (hei)龙 (long)江 (jiang) 的 (de)省 (sheng)会 (hui)", and the ERNIE model is expected to learn that three [mask]s correspond to the characters "哈 (ha)", "尔 (er)" and "滨 (bin)" respectively, which is equivalent to informing the ERNIE model in advance that information to be predicted consists of three characters, and such information may destroy the process of learning the semantics of the words by the model.

In order to solve the above-mentioned problem, the present application provides a method and apparatus for training a language model based on various word vectors, an electronic device and a readable storage medium, so as to avoid the information leakage risk caused by a learning process based on character granularity, enhance the capacity of the language model to learn word meaning information, and improve the prediction performance of the language model.

Figure 1:
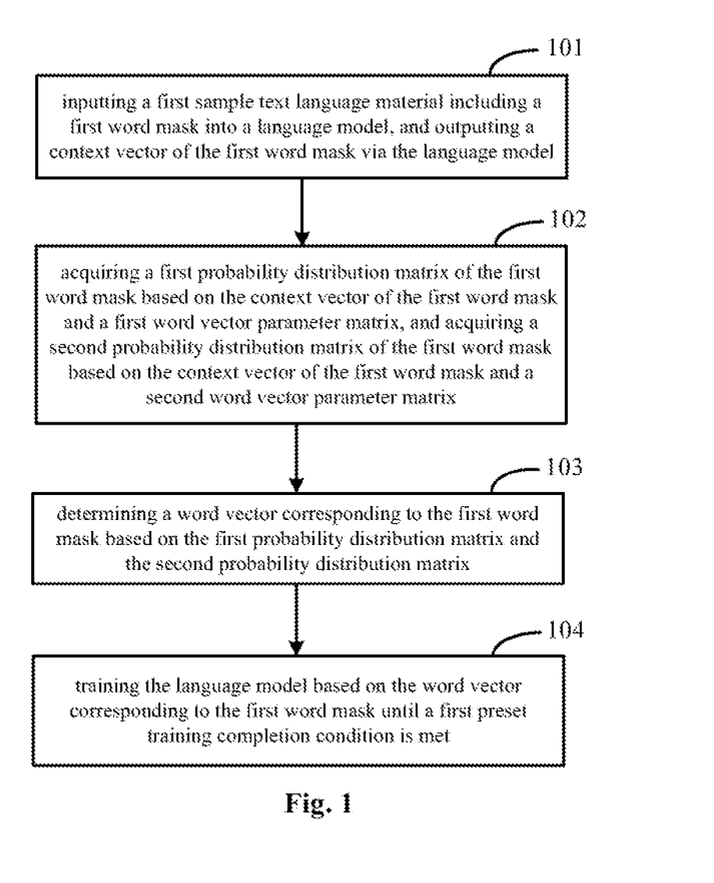
FIG. 1 is a schematic diagram according to a first embodiment of the present application.

FIG. 1 is a schematic diagram according to a first embodiment of the present application. Description is given below with reference to FIG. 1.

101: inputting a first sample text language material including a first word mask into the language model, and outputting by the language model a context vector of the first word mask.

102: acquiring a first probability distribution matrix of the first word mask based on the context vector of the first word mask and a first word vector parameter matrix, and acquiring a second probability distribution matrix of the first word mask based on the context vector of the first word mask and a second word vector parameter matrix.

The first word vector parameter matrix is a pre-trained word vector parameter matrix corresponding to the language model, and the second word vector parameter matrix is a pre-trained word vector parameter matrix corresponding to another language model.

103: determining a word vector corresponding to the first word mask based on the first probability distribution matrix and the second probability distribution matrix.

104: training the language model based on the word vector corresponding to the first word mask, including adjusting parameter values in the language model, until a first preset training completion condition is met.

In the embodiment of the present application, possible words may be included in a vocabulary, the first and second word vector parameter matrices contain word vectors of a plurality of words in the vocabulary respectively, and have the same dimension which may be expressed as [dimension of word vector, size of vocabulary], and the size of the vocabulary is the number of the words contained in the vocabulary. The first probability distribution matrix is used for representing probability values of the first word mask corresponding to the word vectors in the vocabulary respectively based on the first word vector parameter matrix, and the second probability distribution matrix is used for representing probability values of the first word mask corresponding to the word vectors in the vocabulary respectively based on the second word vector parameter matrix.

Since pre-trained and corresponding to the language model, the first word vector parameter matrix may accurately represent the word vector of each word in the vocabulary. Since pre-trained and corresponding to another language model, the second word vector parameter matrix may also accurately represent the word vector of each word in the vocabulary. In order to enable the language model to learn more and richer semantic information, a word vector (the second word vector parameter matrix) trained based on another language model is introduced to further train the language model.

The above-mentioned 101-104 may be an iterative execution process, the language model is trained by executing 101-104 iteratively, and when the first preset training completion condition is met, the training process of the language model is completed, and the word vector corresponding to the first word mask in a text may be accurately output by the trained language model based on 102-103.

Optionally, in a possible implementation of this embodiment, the first preset training completion condition may be set according to an actual requirement, and for example, may include: the perplexity of the word vector output by the language model corresponding to the first sample text language material reaches a first preset threshold; and/or the number of training times (i.e., the number of iterative execution times of 101-104) of the language model reaches a second preset threshold.

It should be noted that part or all of execution subjects of 101-104 may be configured as an application located at a local terminal, or a functional unit, such as a plug-in or software development kit (SDK) provided in the application located at the local terminal, or the like, or a processing engine located at a network-side server, which is not particularly limited in this embodiment.

It may be understood that the application may be configured as a native application (nativeApp) installed at the terminal, or a web application (webApp) of a browser at the terminal, which is not limited in this embodiment.

In this embodiment, the second word vector parameter matrix corresponding to another language model is introduced, and meanwhile, the language model is trained based on the first and second word vector parameter matrices by combining various high-quality word vectors, such that the language model learns multi-source high-quality word meaning information, the capacity of the language model to learn the word meaning information is enhanced, and the prediction performance of the language model is improved.

In addition, with the technical solution of the present application, the language model is trained with the sample text language material including the word mask, and since the word vectors contain richer semantic information representation compared with character vectors, when the word vectors are directly modeled by means of the word mask based on contexts, the process of modeling the word meaning information by the language model is enhanced, the capacity of the language model to learn the word meaning information is enhanced, and the information leakage risk possibly caused by character-based whole word mask may be avoided effectively.

In an implementation, possible words may be contained in a vocabulary, the first and second word vector parameter matrices contain specific representation of the word vectors of a plurality of words in the vocabulary respectively, and therefore, the first and second word vector parameter matrices may also be called a word vector set or an overall word vector. Matrix multiplication is performed on the context vector of each first word mask and the first word vector parameter matrix to obtain the relevance between the context vector of the first word mask and each word vector in the first word vector parameter matrix, thereby obtaining a probability value of the first word mask corresponding to each word vector in the vocabulary based on the first word vector parameter matrix; each probability value represents the probability that the first word mask corresponds to one word vector; similarly, matrix multiplication is performed on the context vector of each first word mask and the second word vector parameter matrix to obtain the relevance between the context vector of the first word mask and each word vector in the second word vector parameter matrix, thereby obtaining a probability value of the first word mask corresponding to each word vector in the vocabulary based on the second word vector parameter matrix; each probability value represents the probability that the first word mask corresponds to one word vector.

Figure 2:
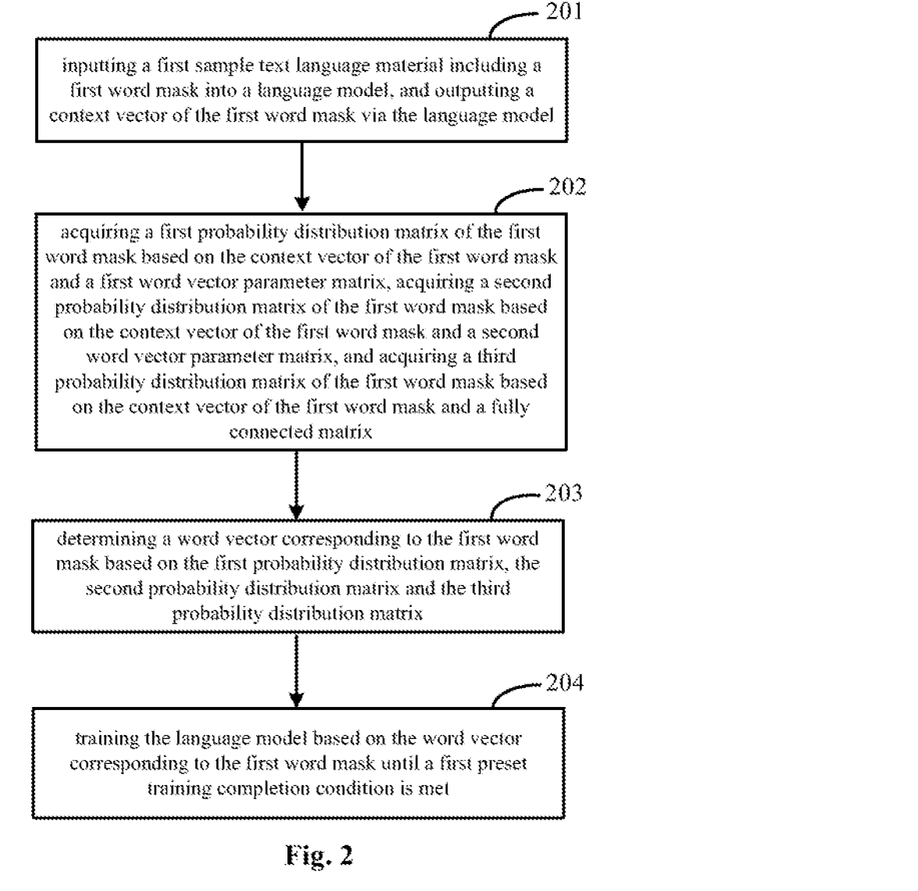
FIG. 2 is a schematic diagram according to a second embodiment of the present application.

FIG. 2 is a schematic diagram according to a second embodiment of the present application, Description is given below with reference to FIG. 2.

201: inputting a first sample text language material including a first word mask into the language model, and outputting a context vector of the first word mask via the language model.

202: acquiring a first probability distribution matrix of the first word mask based on the context vector of the first word mask and a first word vector parameter matrix, acquiring a second probability distribution matrix of the first word mask based on the context vector of the first word mask and a second word vector parameter matrix, and acquiring a third probability distribution matrix of the first word mask based on the context vector of the first word mask and a fully connected (FC) matrix.

The first word vector parameter matrix is a pre-trained word vector parameter matrix corresponding to the language model, and the second word vector parameter matrix is a pre-trained word vector parameter matrix corresponding to another language model. The fully connected matrix may be an initialized untrained matrix.

203: determining a word vector corresponding to the first word mask based on the first probability distribution matrix, the second probability distribution matrix, and the third probability distribution matrix.

In an example, assuming that the number (also referred to as sample number) of words corresponding to the first word mask involved in the training process is batch_size, the dimension of the word vector of each word is embedding_size, and the size of a vocabulary is vocab_size, the dimension of the word vector output by the language model is [batch_size, embedding_size], the dimensions of the first and second word vector parameter matrices as well as the fully connected matrix are all [embedding_size, vocab_size], and the dimensions of the first, second and third probability distribution matrices are all [batch_size, vocab_size].

204: training the language model based on the word vector corresponding to the first word mask until a first preset training completion condition is met.

In this embodiment, since the first and second word vector parameter matrices are pre-trained and correspond to different language models, in order to better fuse the word vectors in the word vector parameter matrices corresponding to two different language models, the FC matrix is introduced to assist and supplement the fused word vectors of the word vector parameter matrices corresponding to the two different language models, thereby further improving the learning effect of the language model on the corresponding word vectors of the word vector parameter matrices corresponding to the two different language models.

Optionally, in a possible implementation of this embodiment, in 202, matrix multiplication may be performed on the context vector of the first word mask and the first word vector parameter matrix to obtain the first probability distribution matrix of the first word mask.

Optionally, in a possible implementation of this embodiment, in 202, matrix multiplication may be performed on the context vector of the first word mask and the second word vector parameter matrix to obtain the second probability distribution matrix of the first word mask.

Optionally, in a possible implementation of this embodiment, in 202, matrix multiplication may be performed on the context vector of the first word mask and the fully connected matrix to obtain the third probability distribution matrix of the first word mask.

In this implementation, matrix multiplication is performed on the context vector of the first word mask and the first word vector parameter matrix, the second word vector parameter matrix and the fully connected matrix respectively to acquire probability distribution of the first word mask corresponding to the plurality of word vectors based on the first and the second word vector parameter matrices and the fully connected matrix respectively, thereby comprehensively determining the word vector corresponding to the first word mask based on the first, second and third probability distribution matrices.

Optionally, in a possible implementation of this embodiment, in 203, the first, second and third probability distribution matrices may be added (summed) to obtain a total probability distribution matrix, and then, probability values in the total probability distribution matrix are normalized, for example, by a normalization index function (softmax), so as to obtain a plurality of normalized probability values of the first word mask corresponding to the plurality of word vectors, and then, the word vector corresponding to the first word mask is determined based on the plurality of normalized probability values. Since the probability values in the total probability distribution matrix are normalized by softmax, the first and second word vector parameter matrices may also be referred to as softmax parameter matrices or softmax word vector parameter matrices.

In this implementation, the probability values of the total probability distribution matrix obtained by adding the first, second and third probability distribution matrices are normalized, and based on the normalized probability values, for example, the word vector with the highest probability value may be selected as the word vector corresponding to the first word mask, thereby accurately determining the word vector corresponding to the first word mask.

Optionally, in a possible implementation of this embodiment, in 204, parameter values of the first and second word vector parameter matrices may be kept unchanged, and the language model and the fully connected matrix are trained based on the word vector corresponding to the first word mask; that is, parameter values in the language model and the fully connected matrix are adjusted until the first preset training completion condition is met, so as to obtain the trained language model and the trained fully connected matrix and take a set of the trained fully connected matrix as well as the first and second word vector parameter matrices as a final word vector set.

In this implementation, the joint training process of the language model and the fully connected matrix may expedite the convergence speed of the language model and the word vector, thereby improving the training effect.

Optionally, before the above-mentioned first or second embodiment, it is also possible to pre-train an initialized language model and an initialized first word vector parameter matrix until a second preset training completion condition is met, so as to obtain the language model and the first word vector parameter matrix, obtain the trained language model and the trained first word vector parameter matrix, and take the trained first word vector parameter matrix as a set of the word vectors of the words in the vocabulary used by the language model.

In this embodiment, after the initialized language model and the initialized first word vector parameter matrix are pre-trained to obtain the trained language model and the trained first word vector parameter matrix, the language model is further trained by combining word vector parameter matrices of another language model, such that the training speed may be expedited, and the training effect may be improved.

Figure 3:
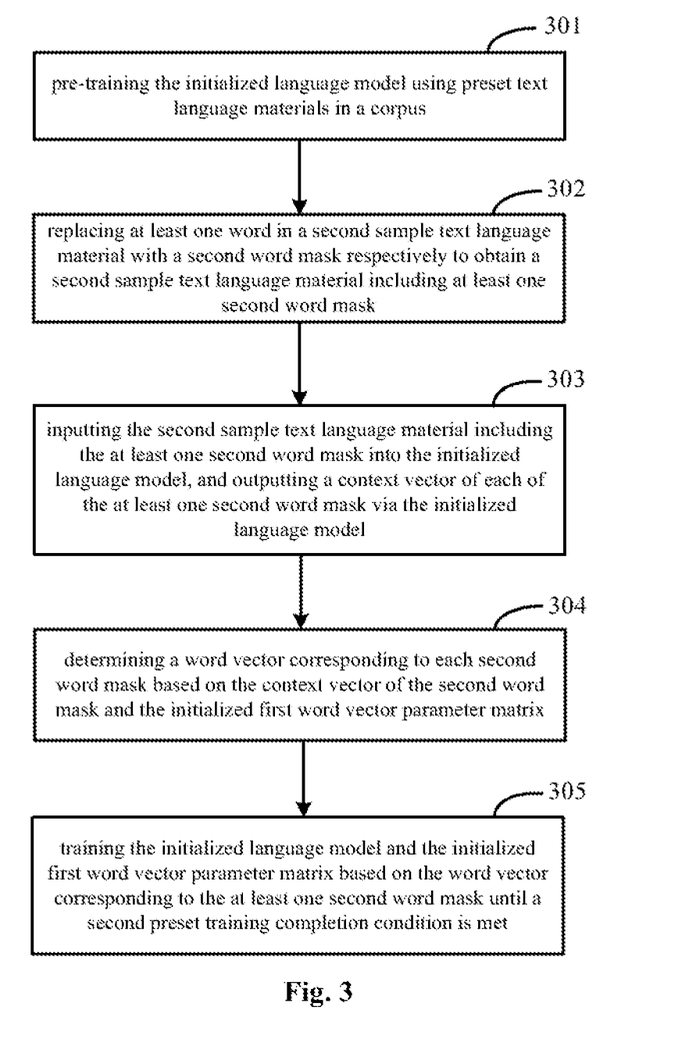
FIG. 3 is a schematic diagram according to a third embodiment of the present application.

FIG. 3 is a schematic diagram according to a third embodiment of the present application. Description is given below with reference to FIG. 3.

The step of training the initialized language model and the initialized first word vector parameter matrix until the second preset training completion condition is met may be implemented by:

301: pre-training the initialized language model using preset text language materials in a corpus.

The pre-training the language model using the preset text language materials in the corpus enables the language model to learn words, entities and entity relationships in the text language materials.

302: replacing at least one word in a second sample text language material with a second word mask respectively to obtain a second sample text language material including at least one second word mask.

The second sample text language material may be the same as or different from the first sample text language material. In addition, the second sample text language material may be one of the preset text language materials in the corpus, or another text language material different from the preset text language materials in the corpus.

Optionally, in a possible implementation of this embodiment, when the at least one word in the second sample text language material is replaced with the second word mask respectively, a context of the second word mask is still represented based on characters.

303: inputting the second sample text language material including the at least one second word mask into the initialized language model, and outputting a context vector of each of the at least one second word mask via the initialized language model.

304: determining a word vector corresponding to each second word mask based on the context vector of the second word mask and the initialized first word vector parameter matrix.

305: training the initialized language model and the initialized first word vector parameter matrix based on the word vector corresponding to the at least one second word mask until the second preset training completion condition is met.

The above-mentioned 302-305 may be an iterative execution process, the initialized language model and the initialized first word vector parameter matrix are trained by executing 302-305 iteratively, and when the second preset training completion condition is met, the training process of the initialized language model and the initialized first word vector parameter matrix is completed.

For example, in an example, the initialized language model is pre-trained using the preset text language materials in the corpus, ""哈 (ha)尔 (er)滨 (bin)" 是 "黑 (hei)龙 (long) 江 (jiang)"的 哈 (which means in English: "Harbin" is the provincial capital of "Heilongjiang")" and ""尔 (ha)滨 (er) 是冰 (bin)"雪 (bing)城 (xue)是 (cheng)哈 (shi) (which means in English: "Harbin" is an icy and snowy city)" are learned, the "尔 (ha)滨 (er)哈 (bin)" in the second sample text language material "尔 (ha)滨 (er)是 (bin)黑 (shi)龙 (hei) 江 (long)的 (jiang)省 (de)会 (sheng)哈 (hui)" is replaced by a word mask input into the language model, a word vector is output via the initialized language model, and the initialized language model and the initialized first word vector parameter matrix are trained based on whether the word vector output by the initialized language model is correct or not, such that after the training process is completed, the language model may correctly output the word vector of the " 尔 (ha)滨 (er)是 (bin)" when "[mask] 黑 (shi)龙 (hei)江 (long) 的 (jiang)省 (de)会 (sheng)哈 (hui)" is input into the language model.

Optionally, in a possible implementation of this embodiment, in 304, the context vector of the second word mask may be multiplied by the initialized first word vector parameter matrix to obtain probability values of the second word mask corresponding to plural word vectors; then, the probability values of the second word mask corresponding to the plural word vectors are normalized to obtain plural normalized probability values of the second word mask corresponding to the plural word vectors, the word vector corresponding to the second word mask is then determined based on the plural normalized probability values, and specifically, the word vector with the highest normalized probability value is determined as the word vector corresponding to the second word mask.

In an implementation, possible words may be included in a vocabulary, the first word vector parameter matrix includes a plurality of word vectors, the first word vectors correspond to the words in the vocabulary respectively, the context vector of the second word mask is multiplied by the initialized first word vector parameter matrix to obtain the relevance between the context vector of each second word mask and each word vector in the initialized first word vector parameter matrix, thereby obtaining probability values of the second word mask corresponding to the word vectors in the vocabulary respectively; the probability values reflect probabilities that the second word mask corresponds to the word vectors.

In this implementation, the context vector of the second word mask is multiplied by the word vector parameter matrix, and the obtained probability values are normalized, for example, by softmax, and the probability values of each second word mask corresponding to the plural word vectors are normalized, such that based on the normalized probability values, the word vector with the highest probability value may be selected as the word vector corresponding to the second word mask, so as to determine the word vector corresponding to the second word mask. When the probability values of each second word mask corresponding to the plural word vectors are normalized by softmax, the first word vector parameter matrix may also be referred to as a softmax parameter matrix or softmax word vector parameter matrix.

Optionally, in a possible implementation of this embodiment, in 305, the second preset training completion condition may be set according to an actual requirement, and for example, may include any one or more of the following conditions: the perplexity of the word vector output by the language model corresponding to the second sample text language materials reaches a first preset threshold value; 302-304 are executed by utilizing a plurality of second sample text language materials, the words in the plural second sample text language materials replaced by the second word masks include a plurality of words (which may be partial or all words) in the vocabulary, and after the plurality of normalized probability values of each second word mask corresponding to the plurality of word vectors are obtained in 304, the normalized probability values of all the second word masks involved in the training process are maximized; and the number of training times (i.e., the number of iterative execution times of 302-305) of the initialized language model and the initialized word vector parameter matrix reaches a second preset threshold value.

In this embodiment, the second sample text language material including the second word mask is input into the language model, and the context vector of the second word mask is output via the initialized language model; then, the word vector corresponding to the second word mask is determined based on the context vector of the second word mask and the initialized first word vector parameter matrix; then, the initialized language model and the first word vector parameter matrix are trained based on the word vector corresponding to the second word mask until the second preset training completion condition is met, the trained language model and the trained first word vector parameter matrix may be obtained, and the trained first word vector parameter matrix serves as the word vector of each word in the vocabulary corresponding to the language model; since the word vector contains richer semantic information representation compared with a character vector and introduces semantic information representation with greater granularity, when the word vector is modeled by means of the word mask based on contexts, the process of modeling word meaning information by the language model is enhanced, and the capacity of the language model to learn the word meaning information is enhanced.

In addition, in this embodiment, since the initialized language model is trained with the second sample text language material including the second word mask, the information leakage risk possibly caused by character-based whole word mask may be avoided effectively.

In addition, with this embodiment, the initialized language model and the initialized first word vector parameter matrix are jointly trained in combination, such that the convergence speed of the language model and the word vectors may be expedited, thereby improving the training effect.

Optionally, in a possible implementation of this embodiment, in 302, word segmentation may be performed on the second sample text language material, and each of the at least one word in the second sample text language material may be replaced with one second word mask based on the word segmentation result. The context of the second word mask is still represented based on characters in the second sample text language material except for the word replaced with the second mask.

In this implementation, word segmentation is performed on the second sample text language material, the words in the second sample text language material may be accurately determined according to the word segmentation result, and each of one or more of the words may be replaced by one second word mask, such that the word masks may be correctly set for training the initialized language model, the word vectors are modeled based on contexts by the initialized language model, the process of modeling word meaning information by the language model is enhanced, and the capacity of the language model to learn the word meaning information is enhanced.

Optionally, in a possible implementation of this embodiment, the language model and the another language model in the above-mentioned embodiment may be any two language models of different types, or different language models of the same type trained with the preset text language materials in different corpora, and the specific types of the language model and the another language model are not limited in the embodiment of the present application.

For example, in an implementation, the language model may be an ERNIE model, and the another language model may be a continuous bag of word (CBOW) model or a language model different from the ERNIE model and the CBOW model.

The ERNIE model may learn the semantic representation of a complete concept by modeling prior semantic knowledge, such as entity concepts in mass data, or the like, and is pre-trained by masking semantic units, such as words and the entity concepts, or the like, such that the representation of semantic knowledge units by the ERNIE model is closer to the real world, and the ERNIE model directly models the prior semantic knowledge units while performing the modeling process based on character feature input, and has a strong semantic representation capability. In this embodiment, the ERNIE model is used as the language model, and the strong semantic representation capability of the ERNIE model may be used to model the words, the entities and the entity relationships in the mass data and learn the semantic knowledge of the real world, thereby enhancing the semantic representation capability of the model; for example, by learning the representation of the words and the entities, the ERNIE model is able to model the relationship between "尔 (ha)滨 (er)黑" and "龙 (hei) 江 (long)哈 (jiang)" and learns "尔 (ha)滨 (er)是 (bin)黑 (shi)龙 (hei)江 (long)的 (ji- ang)省 (de)会 (sheng) 哈 (hui) (which means in English: Har- bin is the provincial capital of Heilongjiang" and "尔 (ha) 滨 (er) 是冰 (bin)"雪 (bing)城 (xue)是 (cheng)省会 (shi) (which means in English: Harbin is an icy and snowy city)".

The CBOW model may predict a word vector of an intermediate word based on a word vector corresponding to a context of the intermediate word; since the CBOW model does not include a hidden layer, the training speed is high, and since the calculation of each word vector by the CBOW model is only related to the context limited by a sliding window, the CBOW model has fewer training parameters, lower complexity and higher prediction accuracy. Meanwhile, the ERNIE model is further trained by a pre-trained word vector parameter matrix (also called CBOW word vector) corresponding to the CBOW model in conjunction with a pre-trained word vector parameter matrix (also called ERNIE-WORD word vector) corresponding to the ERNIE model, so that the ERNIE model learns word meaning information of the high-quality CBOW word vector and the high-quality ERNIE-WORD word vector at the same time, thus enhancing the capacity of the ERNIE model to learn the word meaning information, and improving the capacity of the ERNIE model to predict words in a text.

In addition, on the basis of the above-mentioned embodiment, after the trained language model is obtained when the first preset training completion condition is met, the language model may be further optimized with a supervised NLP task, so as to further improve the prediction performance of the language model in the NLP task.

Optionally, in a possible implementation of this embodiment, the trained language model may be used to perform the NLP task to obtain a processing result, and then, according to a difference between the processing result and annotated result information, parameter values in the language model are fine tuned until a preset condition is met, for example, the difference between the processing result and the annotated result information is smaller than a preset difference, and/or the number of training times of the language model reaches a preset number of times, or the like. The annotated result information is a correct processing result which is manually annotated in advance for the NLP task to be performed.

Specifically, the above-mentioned NLP task may be any one or more of NLP tasks, such as classification, matching, sequence annotation, or the like, which is not particularly limited in this embodiment. Correspondingly, the processing result is a processing result of the specific NLP task, for example, a classification result, a matching result, a sequence annotation result, or the like.

In an implementation, the NLP task may be performed by using the trained language model in conjunction with another network model for implementing classification, matching and sequence annotation, for example, a convolutional neural network (CNN), a long short term memory (LSTM) model and a bag of word (BOW) model, so as to obtain the processing result; for example, the another network model for implementing classification, matching and sequence annotation may perform these processing tasks based on the output of the language model, so as to obtain the corresponding classification result, the corresponding matching result, the corresponding sequence annotation result and other processing results.

In this embodiment, since the word vector parameter matrix is not required, the language model may be further optimized with the NLP task with supervision data (i.e., the annotated result information) without changing the overall structure of the language model, thus improving the prediction performance of the language model, and facilitating iterative optimization of the language model according to each NLP task.

It should be noted that for simplicity of description, the above-mentioned embodiments of the method are described as combinations of a series of acts, but those skilled in the art should understand that the present application is not limited by the described order of acts, as some steps may be performed in other orders or simultaneously according to the present application. Further, those skilled in the art should also understand that the embodiments described in this specification are preferred embodiments and that acts and modules referred to are not necessary for the present application.

In the above-mentioned embodiments, the descriptions of the respective embodiments have respective emphasis, and for parts that are not described in detail in a certain embodiment, reference may be made to the related descriptions of other embodiments.

Figure 4:
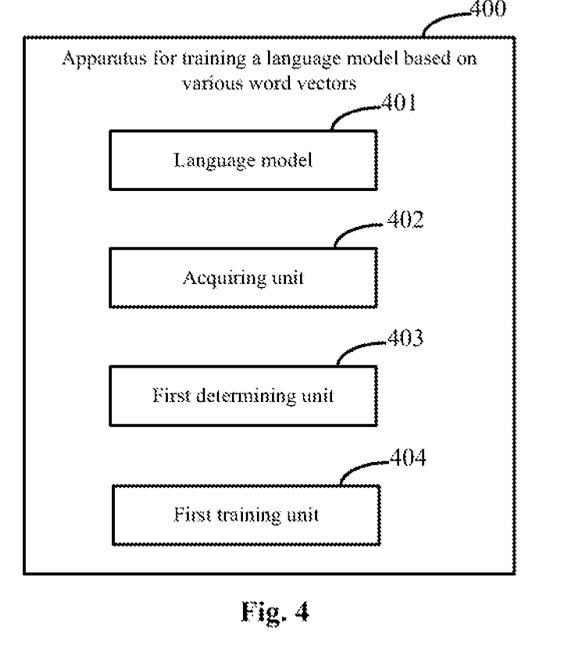
FIG. 4 is a schematic diagram according to a fourth embodiment of the present application.

FIG. 4 is a schematic diagram according to a fourth embodiment of the present application. As shown in FIG. 4, an apparatus 400 for training a language model based on various word vectors according to this embodiment may include the language model 401, an acquiring unit 402, a first determining unit 403 and a first training unit 404. The language model 401 is configured to receive a first sample text language material including a first word mask, and output a context vector of the first word mask; the acquiring unit 402 is configured to acquire a first probability distribution matrix of the first word mask based on the context vector of the first word mask and a first word vector parameter matrix, and to acquire a second probability distribution matrix of the first word mask based on the context vector of the first word mask and a second word vector parameter matrix; the first word vector parameter matrix is a pre-trained word vector parameter matrix corresponding to the language model, and the second word vector parameter matrix is a pre-trained word vector parameter matrix corresponding to another language model; the first determining unit 403 is configured to determine the word vector corresponding to the first word mask based on the first probability distribution matrix and the second probability distribution matrix; the first training unit 404 is configured to train the language model based on the word vector corresponding to the first word mask until a first preset training completion condition is met.

It should be noted that part or all of execution subjects of the training apparatus for the language model according to this embodiment may be configured as an application located at a local terminal, or a functional unit, such as a plug-in or software development kit (SDK) provided in the application located at the local terminal, or the like, or a processing engine located at a network-side server, which is not particularly limited in this embodiment.

It may be understood that the application may be configured as a native application (nativeApp) installed at the terminal, or a web application (webApp) of a browser at the terminal, which is not limited in this embodiment.

In this embodiment, by introducing the second word vector parameter matrix corresponding to another language model, the language model is trained based on the first and second word vector parameter matrices by combining various high-quality word vectors, such that the language model learns multi-source high-quality word meaning information, the capacity of the language model to learn the word meaning information is enhanced, and the prediction performance of the language model is improved.

In addition, with the technical solution of the present application, the language model is trained with the sample text language material including the word mask, and since the word vectors contain richer semantic information representation compared with character vectors, when the word vectors are directly modeled by means of the word mask based on contexts, the process of modeling the word meaning information by the language model is enhanced, the capacity of the language model to learn the word meaning information is enhanced, and the information leakage risk possibly caused by character-based whole word mask may be avoided effectively.

Optionally, in a possible implementation of this embodiment, the acquiring unit 402 is further configured to acquire a third probability distribution matrix of the first word mask based on the context vector of the first word mask and a fully connected matrix. Correspondingly, in this embodiment, the first determining unit 403 is specifically configured to determine the word vector corresponding to the first word mask based on the first, second and third probability distribution matrices.

Optionally, in a possible implementation of this embodiment, the acquiring unit 402 is specifically configured to multiply the context vector of the first word mask by the first word vector parameter matrix to obtain the first probability distribution matrix of the first word mask, and/or configured to multiply the context vector of the first word mask by the second word vector parameter matrix to obtain the second probability distribution matrix of the first word mask, and/or configured to multiply the context vector of the first word mask with the fully connected matrix to obtain the third probability distribution matrix of the first word mask.

Figure 5:
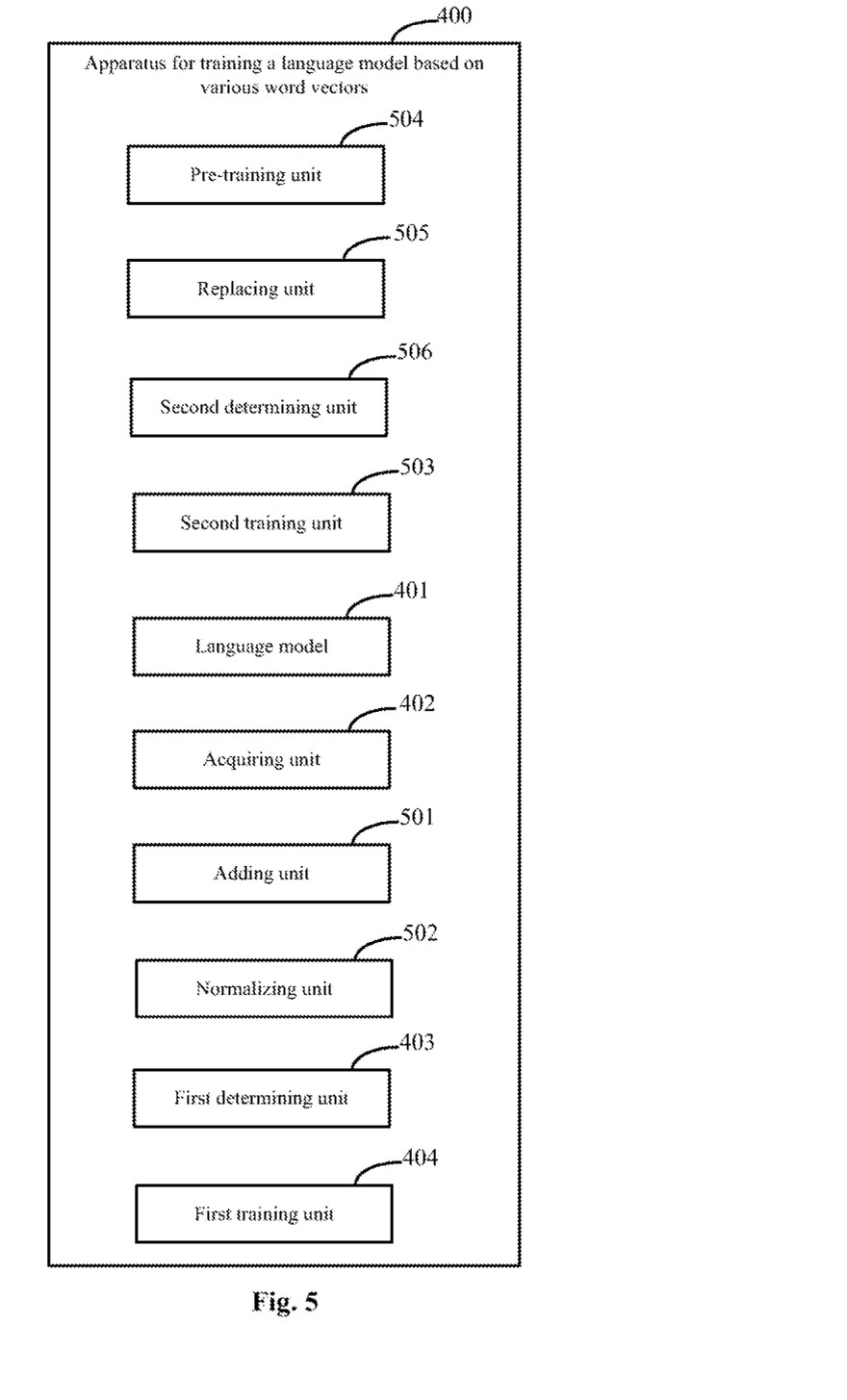
FIG. 5 is a schematic diagram according to a fifth embodiment of the present application.

FIG. 5 is a schematic diagram according to a fifth embodiment of the present application, and as shown in FIG. 5, on the basis of the embodiment shown in FIG. 4, the apparatus 400 for training a language model based on various word vectors according to this embodiment may further include an adding unit 501 and a normalizing unit 502. The adding unit 501 is configured to add the first, second and third probability distribution matrices to obtain a total probability distribution matrix; the normalization unit 502 is configured to normalize probability values in the total probability distribution matrix to obtain plural normalized probability values of the first word mask corresponding to plural word vectors. Correspondingly, in this embodiment, the first determining unit 403 is specifically configured to determine the word vector corresponding to the first word mask based on the plurality of normalized probability values.

Optionally, in a possible implementation of this embodiment, the first training unit 404 is specifically configured to train the language model and the fully connected matrix based on the word vector corresponding to the first word mask until the first preset training completion condition is met.

Optionally, referring to FIG. 5 again, the apparatus 400 for training a language model based on various word vectors according to the above-mentioned embodiment may further include a second training unit 503 configured to train an initialized language model and an initialized first word vector parameter matrix until a second preset training completion condition is met, so as to obtain the language model 401 and the first word vector parameter matrix.

Optionally, referring to FIG. 5 again, the apparatus 400 for training a language model based on various word vectors according to the above-mentioned embodiment may further include a pre-training unit 504, a replacing unit 505 and a second determining unit 506. The pre-training unit 504 is configured to pre-train the initialized language model using preset text language materials in a corpus; the replacing unit 505 is configured to replace at least one word in a second sample text language material with a second word mask respectively to obtain a second sample text language material including at least one second word mask to be input into the initialized language model; the initialization language model is configured to output a context vector of each of the at least one second word mask based on the second sample text language material which is input by the replacing unit and includes the at least one second word mask; the second determining unit 506 is configured to determine a word vector corresponding to each second word mask based on the context vector of the second word mask and the initialized first word vector parameter matrix; the second training unit 503 is specifically configured to train the initialized language model and the initialized first word vector parameter matrix based on the word vector corresponding to the at least one second word mask until the second preset training completion condition is met.

Optionally, in a possible implementation of this embodiment, the replacing unit 505 is specifically configured to perform word segmentation on the second sample text language material, and replace each of the at least one word in the second sample text language material with one second word mask based on the word segmentation result.

Optionally, in a possible implementation of this embodiment, the language model and the another language model in the above-mentioned embodiment may be any two language models of different types, or different language models of the same type trained with the preset text language materials in different corpora, and the specific types of the language model and the another language model are not limited in the embodiment of the present application.

For example, in an implementation, the language model may be an ERNIE model, and the another language model may be a CBOW model or a language model different from the ERNIE model and the CBOW model.

It should be noted that the method according to the embodiments corresponding to FIGS. 1 to 3 may be implemented by the apparatus for training a language model based on various word vectors according to the above-mentioned embodiments of FIGS. 4 to 5. For detailed description, reference may be made to relevant contents in the embodiments corresponding to FIGS. 1 to 3, and the detailed description is not repeated herein.

According to embodiments of the present application, there are also provided an electronic device and a non-transitory computer-readable storage medium storing computer instructions.

Figure 6:
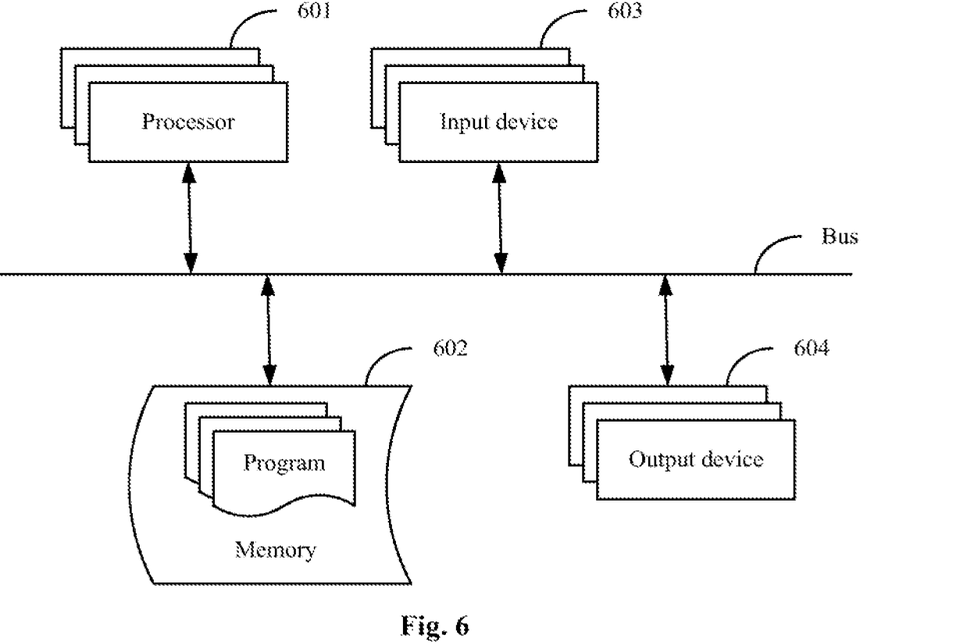
FIG. 6 is a schematic diagram of an electronic device for implementing a method for training a language model according to the embodiments of the present application.

FIG. 6 is a schematic diagram of an electronic device for implementing a method for training a language model based on various word vectors according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital processors, cellular telephones, smart phones, wearable devices, and other similar computing devices. The components shown herein, their connections and relationships, and their functions, are meant to be exemplary only, and are not meant to limit implementation of the present application described and/or claimed herein.

As shown in FIG. 6, the electronic device includes one or more processors 601, a memory 602, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a graphical user interface (GUI) at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 6, one processor 601 is taken as an example.

The memory 602 is configured as the non-transitory computer-readable storage medium according to the present application. The memory stores instructions executable by the at least one processor to cause the at least one processor to perform a method for training a language model based on various word vectors according to the present application. The non-transitory computer-readable storage medium according to the present application stores computer instructions for causing a computer to perform the method for training a language model based on various word vectors according to the present application.

The memory 602 which is a non-transitory computer-readable storage medium may be configured to store non-transitory software programs, non-transitory computer executable programs and units, such as program instructions/units corresponding to the method for training a language model based on various word vectors according to the embodiments of the present application (for example, the language model 401, the acquiring unit 402, the first determining unit 403 and the first training unit 404 shown in FIG. 4). The processor 601 executes various functional applications and data processing of a server, that is, implements the method for training a language model based on various word vectors according to the above-mentioned embodiments, by running the non-transitory software programs, instructions, and units stored in the memory 602.

The memory 602 may include a program storage area and a data storage area, the program storage area may store an operating system and an application program required for at least one function; the data storage area may store data created according to use of the electronic device for implementing the method for training a language model based on various word vectors according to the embodiments of the present application, or the like. Furthermore, the memory 602 may include a high-speed random access memory, or a non-transitory memory, such as at least one magnetic disk storage device, a flash memory device, or other non-transitory solid state storage devices. In some embodiments, optionally, the memory 602 may include memories remote from the processor 601, and such remote memories may be connected via a network to the electronic device for implementing the method for training a language model based on various word vectors according to the embodiments of the present application. Examples of such a network include, but are not limited to, the Internet, intranets, local area networks, mobile communication networks, and combinations thereof.

The electronic device for the method for training a language model based on various word vectors may further include an input device 603 and an output device 604. The processor 601, the memory 602, the input device 603 and the output device 604 may be connected by a bus or other means, and FIG. 6 takes the connection by a bus as an example.

The input device 603 may receive input numeric or character information and generate key signal input related to user settings and function control of the electronic device for implementing the method for training a language model based on various word vectors according to the embodiments of the present application, such as a touch screen, a keypad, a mouse, a track pad, a touch pad, a pointing stick, one or more mouse buttons, a trackball, a joystick, or the like. The output device 604 may include a display device, an auxiliary lighting device (for example, an LED) and a tactile feedback device (for example, a vibrating motor), or the like. The display device may include, but is not limited to, an LCD (liquid crystal display), an LED (light emitting diode) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer-readable medium" refer to any computer program product, device and/or apparatus (for example, magnetic discs, optical disks, memories, PLDs (programmable logic devices)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display device (for example, a CRT (cathode ray tube) or LCD (liquid crystal display) monitor) for displaying information to a user; and a keyboard and a pointing device (for example, a mouse or a trackball) by which a user may provide input to the computer. Other kinds of devices may also be used to provide interaction with a user; for example, feedback provided to a user may be any form of sensory feedback (for example, visual feedback, auditory feedback, or tactile feedback); and input from a user may be received in any form (including acoustic, language or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: an LAN (local area network), a WAN (wide area network) and the Internet.

A computer system may include a client and a server. Generally, the client and the server are remote from each other and interact through the communication network. The relationship between the client and the server is generated by virtue of computer programs which are run on respective computers and have a client-server relationship to each other.

With the technical solution of the embodiments of the present application, the second word vector parameter matrix corresponding to other language models is introduced, and meanwhile, the language model is trained based on the first and second word vector parameter matrices by combining various high-quality word vectors, such that the language model learns multi-source high-quality word meaning information, the capacity of the language model to learn the word meaning information is enhanced, and the prediction performance of the language model is improved.

In addition, with the technical solution of the present application, the language model is trained with the sample text language material including the word mask, and since the word vectors contain richer semantic information representation compared with character vectors, when the word vectors are directly modeled by means of the word mask based on contexts, the process of modeling the word meaning information by the language model is enhanced, the capacity of the language model to learn the word meaning information is enhanced, and the information leakage risk possibly caused by character-based whole word mask may be avoided effectively.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for training a language model based on various word vectors, comprising:
inputting a first sample text language material comprising a first word mask into the language model, and outputting a context vector of the first word mask via the language model;
acquiring a first probability distribution matrix of the first word mask based on the context vector of the first word mask and a first word vector parameter matrix, acquiring a second probability distribution matrix of the first word mask based on the context vector of the first word mask and a second word vector parameter matrix, and acquiring a third probability distribution matrix of the first word mask based on the context vector of the first word mask and a connected matrix; wherein the first word vector parameter matrix is a pre-trained word vector parameter matrix corresponding to the language model, and the second word vector parameter matrix is a pre-trained word vector parameter matrix corresponding to another language model;

obtaining a total probability distribution matrix by adding the first probability distribution matrix, the second probability distribution matrix and the third probability distribution matrix;

obtaining plural normalized probability values of the first word mask corresponding to plural word vectors by normalizing probability values in the total probability distribution matrix;

determining the word vector corresponding to the first word mask based on the plural normalized probability values; and training the language model based on the word vector corresponding to the first word mask.

2. The method according to claim 1, wherein the acquiring a first probability distribution matrix of the first word mask based on the context vector of the first word mask and a first word vector parameter matrix comprises: obtaining the first probability distribution matrix of the first word mask by multiplying the context vector of the first word mask by the first word vector parameter matrix;

wherein the acquiring a second probability distribution matrix of the first word mask based on the context vector of the first word mask and a second word vector parameter matrix comprises: obtaining the second probability distribution matrix of the first word mask by multiplying the context vector of the first word mask by the second word vector parameter matrix; and wherein the acquiring a third probability distribution matrix of the first word mask based on the context vector of the first word mask and a connected matrix comprises: obtaining the third probability distribution matrix of the first word mask by multiplying the context vector of the first word mask by the connected matrix.

3. The method according to claim 1, wherein the training the language model based on the word vector corresponding to the first word mask comprises:

training the language model and the connected matrix based on the word vector corresponding to the first word mask.

4. The method according to claim 1, further comprising: before the inputting a first sample text language material comprising a first word mask into the language model, and outputting a context vector of the first word mask via the language model;

obtaining the language model and the first word vector parameter matrix by training an initialized language model and an initialized first word vector parameter matrix.

5. The method according to claim 4, wherein the training an initialized language model and an initialized first word vector parameter matrix comprises:

pre-training the initialized language model using preset text language materials in a corpus;

obtaining a second sample text language material comprising at least one second word mask by replacing at least one word in a second sample text language material with a second word mask respectively;

inputting the second sample text language material comprising the at least one second word mask into the initialized language model, and outputting a context vector of each of the at least one second word mask via the initialized language model;

determining a word vector corresponding to each second word mask based on the context vector of the second word mask and the initialized first word vector parameter matrix; and training the initialized language model and the initialized first word vector parameter matrix based on the word vector corresponding to the at least one second word mask.

6. The method according to claim 5, wherein the replacing at least one word in a second sample text language material with a second word mask respectively comprises:

performing word segmentation on the second sample text language material, and replacing each of the at least one word in the second sample text language material with one second word mask based on the word segmentation result.

7. The method according to claim 1, wherein the language model comprises an enhanced representation from knowledge Integration (ERNIE) model; and the another language model comprises a continuous bag of word (CBOW) model.

8. An electronic device, comprising:
at least one processor; and
a memory connected with the at least one processor communicatively;
wherein the memory stores instructions executable by the at least one processor to cause the at least one processor to perform a method for training a language model based on various word vectors, which comprises:
inputting a first sample text language material comprising a first word mask into the language model, and outputting a context vector of the first word mask via the language model;
acquiring a first probability distribution matrix of the first word mask based on the context vector of the first word mask and a first word vector parameter matrix, acquiring a second probability distribution matrix of the first word mask based on the context vector of the first word mask and a second word vector parameter matrix, and acquiring a third probability distribution matrix of the first word mask based on the context vector of the first word mask and a connected matrix; wherein the first word vector parameter matrix is a pre-trained word vector parameter matrix corresponding to the language model, and the second word vector parameter matrix is a pre-trained word vector parameter matrix corresponding to another language model;
obtaining a total probability distribution matrix by adding the first probability distribution matrix, the second probability distribution matrix and the third probability distribution matrix;
obtaining plural normalized probability values of the first word mask corresponding to plural word vectors by normalizing probability values in the total probability distribution matrix;
determining the word vector corresponding to the first word mask based on the plural normalized probability values; and
training the language model based on the word vector corresponding to the first word mask.

9. The electronic device according to claim 8, wherein the acquiring a first probability distribution matrix of the first word mask based on the context vector of the first word mask and a first word vector parameter matrix comprises: obtaining the first probability distribution matrix of the first word mask by multiplying the context vector of the first word mask by the first word vector parameter matrix;

wherein the acquiring a second probability distribution matrix of the first word mask based on the context vector of the first word mask and a second word vector parameter matrix comprises: obtaining the second probability distribution matrix of the first word mask by multiplying the context vector of the first word mask by the second word vector parameter matrix; and wherein the acquiring a third probability distribution matrix of the first word mask based on the context vector of the first word mask and a connected matrix comprises: obtaining the third probability distribution matrix of the first word mask by multiplying the context vector of the first word mask by the connected matrix.

10. The electronic device according to claim 8, wherein the training the language model based on the word vector corresponding to the first word mask comprises:

training the language model and the connected matrix based on the word vector corresponding to the first word mask.

11. The electronic device according to claim 8, wherein the method further comprises: before the inputting a first sample text language material comprising a first word mask into the language model, and outputting a context vector of the first word mask via the language model;

obtaining the language model and the first word vector parameter matrix by training an initialized language model and an initialized first word vector parameter matrix.

12. The electronic device according to claim 11, wherein the training an initialized language model and an initialized first word vector parameter matrix comprises:

pre-training the initialized language model using preset text language materials in a corpus;

obtaining a second sample text language material comprising at least one second word mask by replacing at least one word in a second sample text language material with a second word mask respectively;

inputting the second sample text language material comprising the at least one second word mask into the initialized language model, and outputting a context vector of each of the at least one second word mask via the initialized language model;

determining a word vector corresponding to each second word mask based on the context vector of the second word mask and the initialized first word vector parameter matrix; and training the initialized language model and the initialized first word vector parameter matrix based on the word vector corresponding to the at least one second word mask.

13. The electronic device according to claim 12, wherein the replacing at least one word in a second sample text language material with a second word mask respectively comprises:

performing word segmentation on the second sample text language material, and replacing each of the at least one word in the second sample text language material with one second word mask based on the word segmentation result.

14. The electronic device according to claim 8, wherein the language model comprises an enhanced representation from knowledge Integration (ERNIE) model; and the another language model comprises a continuous bag of word (CBOW) model.

15. A non-transitory computer-readable storage medium with computer instructions stored thereon, wherein the computer instructions are used for causing a computer to perform a method for training a language model based on various word vectors, which comprises:

inputting a first sample text language material comprising a first word mask into the language model, and outputting a context vector of the first word mask via the language model;

acquiring a first probability distribution matrix of the first word mask based on the context vector of the first word mask and a first word vector parameter matrix, acquiring a second probability distribution matrix of the first word mask based on the context vector of the first word mask and a second word vector parameter matrix, and acquiring a third probability distribution matrix of the first word mask based on the context vector of the first word mask and a connected matrix; wherein the first word vector parameter matrix is a pre-trained word vector parameter matrix corresponding to the language model, and the second word vector parameter matrix is a pre-trained word vector parameter matrix corresponding to another language model;

obtaining a total probability distribution matrix by adding the first probability distribution matrix, the second probability distribution matrix and the third probability distribution matrix;

obtaining plural normalized probability values of the first word mask corresponding to plural word vectors by normalizing probability values in the total probability distribution matrix;

determining the word vector corresponding to the first word mask based on the plural normalized probability values; and training the language model based on the word vector corresponding to the first word mask.

* * * * *